(12) United States Patent
Pandit

(10) Patent No.: US 7,657,452 B2
(45) Date of Patent: Feb. 2, 2010

(54) SYSTEM AND METHOD FOR TOUR OPTIMIZATION

(75) Inventor: Ram Pandit, Duluth, GA (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 1243 days.

(21) Appl. No.: 10/716,476

(22) Filed: Nov. 20, 2003

(65) Prior Publication Data

US 2005/0114189 A1 May 26, 2005

(51) Int. Cl.
*G06Q 10/00* (2006.01)
(52) U.S. Cl. ......................................................... 705/7
(58) Field of Classification Search ....................... 705/7
See application file for complete search history.

(56) References Cited

U.S. PATENT DOCUMENTS

| | | | |
|---|---|---|---|
| 5,063,506 | A | 11/1991 | Brockwell et al. |
| 5,797,113 | A | 8/1998 | Kambe et al. |
| 5,880,958 | A | 3/1999 | Helms et al. |
| 5,890,134 | A * | 3/1999 | Fox .................................. 705/9 |
| 6,035,291 | A | 3/2000 | Thiel |
| 6,240,362 | B1 | 5/2001 | Gaspard, II |
| 6,314,361 | B1 | 11/2001 | Yu et al. |
| 6,321,207 | B1 | 11/2001 | Ye |
| 6,374,227 | B1 | 4/2002 | Ye |
| 6,385,537 | B2 | 5/2002 | Gaspard, II |
| 6,411,897 | B1 | 6/2002 | Gaspard, II |
| 6,459,986 | B1 | 10/2002 | Boyce et al. |
| 6,463,419 | B1 | 10/2002 | Kluss |
| 6,891,897 | B1 * | 5/2005 | Bevan et al. ................... 375/265 |
| 6,920,366 | B1 * | 7/2005 | Luh et al. ....................... 700/101 |
| 6,940,824 | B2 * | 9/2005 | Shibutani ........................ 370/252 |
| 7,139,721 | B2 * | 11/2006 | Borders et al. .................... 705/9 |
| 7,212,984 | B2 | 5/2007 | Wolfe et al. |

(Continued)

OTHER PUBLICATIONS

Thompson, Paul; Psaraftis, Harilaos; "Cyclic Transfer algorithms for multivehicle routing and scheduling problems", Sep.-Oct. 1993, Operations Research, vol. 41, No. 5, pp. 935-946.*

(Continued)

*Primary Examiner*—Jonathan G Sterrett
(74) *Attorney, Agent, or Firm*—Finnegan, Henderson, Farabow, Garrett & Dunner LLP

(57) ABSTRACT

A method for optimizing a tour having a first segment with an origination point and a destination point and a second segment with an origination point and a destination point. The method comprises: receiving first load data about a first load and second load data about a second load; evaluating a fit of the first load data on the first segment and a fit of the second load data on the first segment; evaluating a fit of the first load data on the second segment and a fit of the second load data on the second segment; ranking the relative fits of the first load data and the second load data against the first segment on a first segment list; ranking the relative fits of the first load data and the second load data against the second segment on a second segment list; assigning the load having the highest ranking fit from the first segment list to the first segment and removing that load from the second segment list; and assigning the load having the highest ranking fit from the second segment list to the segment.

24 Claims, 20 Drawing Sheets

U.S. PATENT DOCUMENTS

| | | | | |
|---|---|---|---|---|
| 7,251,612 | B1* | 7/2007 | Parker et al. | 705/9 |
| 7,295,990 | B1* | 11/2007 | Braumoeller et al. | 705/7 |
| 2001/0034608 | A1 | 10/2001 | Gendreau | |
| 2002/0013829 | A1 | 1/2002 | Kishimoto | |
| 2002/0065738 | A1 | 5/2002 | Riggs et al. | |
| 2002/0103685 | A1 | 8/2002 | Murata | |
| 2003/0036935 | A1 | 2/2003 | Nel | |
| 2004/0030428 | A1* | 2/2004 | Crampton et al. | 700/101 |
| 2007/0039001 | A1* | 2/2007 | Briccarello et al. | 718/102 |

OTHER PUBLICATIONS

Thompson, Paul; Orlin, James B; "The Theory of Cyclic Transfers", Aug. 1989, Massachusetts Institute of Technology Working Paper, pp. 1-45.*

Christiansen, Marielle; Nygreen, Bjoern; "A method for solving ship routing problems with inventory constraints", 1998, Annuals of Operations Research, pp. 357-358.*

Braysy, Olli; Gendreau, Michel; "Route Construction and Local Search Algorithms for the Vehicle Routing Problem with Time Windows", Report No. STF42 A01024, Dec. 18, 2001, SINTEF Applied Mathematics, pp. 1-28.*

Labiad, Noureddine; "Scheduling and Routing of Vehicles for a Transportation Company", NC State Masters Thesis, 2002, pp. 1-39.*

"A personal-computer assisted decision support system for private versus common carrier selection" Hokey Min, Transportation Research Part E: Logistics and Transportation Review, vol. 34, Issue 3, Sep. 1998, pp. 229-241.*

"The paired combinatorial logit model: properties, estimation and application" Frank S. Koppelmana, Chieh-Hua Wen1, Transportation Research Part B: Methodological, vol. 34, Issue 2, Feb. 2000, pp. 75-89.*

"Consolidating and Dispatching Truck Shipments of Mobil Heavy Petroleum Products", Bausch et al., 1995 Institute for Operations Research and the Management Sciences, Interfaces, 25: 2 Mar.-Apr. 1995 (pp. 1-17).*

Office Action mailed Apr. 28, 2009, in co-pending U.S. Appl. No. 10/716,478.

Office Action mailed Nov. 14, 2008, in co-pending U.S. Appl. No. 10/716,478.

Office Action mailed Apr. 17, 2008, in co-pending U.S. Appl. No. 10/716,478.

Office Action mailed Feb. 26, 2009, in co-pending U.S. Appl. No. 10/716,477.

Office Action mailed Aug. 18, 2008, in co-pending U.S. Appl. No. 10/716,477.

Strozniak, Peter; Sharing the Load, Industry Weekly, Sep. 2001, pp. 47-51, vol. 250, N. 12.

* cited by examiner

Dashboard

| Board | Customize |
|---|---|
Week of March1 – March 8, 2003

Severe Errors: 5
Critical Errors: 10
Warning Errors: 20
Manuals 5
New Loads Arrived: 50
(since 12:50:00 AM)
Open Segments: 10
Populated Segments: 50
Open Tours: 30
Total DHD Miles: 1000
DHD%: 10%
Dummy loads unassigned 4

Customize

☐ Severe Error
☐ Critical Error
☐ Warning Error
☐ Show New Loads
☐ Show Open Segments
☐ Show Populated Segments
☐ Show Open Tours
☐ Show DHD Miles Total
☐ Show DHD Miles %
☐ Show Total Cost
☐ Show Total Savings

Figure 18

Alerts

940

+ Severe: 5

| ID | Status | Description | Action | User | Time Created | Time Acted |
|----|--------|-------------|--------|------|--------------|------------|
| ☐ | | | | | | |
| ☐ | | | | | | |
| ☐ | | | | | | |

+ Critical: 10

| ID | Status | Description | Action | User | Time Created | Time Acted |
|----|--------|-------------|--------|------|--------------|------------|
| ☐ | | | | | | |
| ☐ | | | | | | |
| ☐ | | | | | | |

+ Warning: 20

| ID | Status | Description | Action | User | Time Created | Time Acted |
|----|--------|-------------|--------|------|--------------|------------|
| ☐ | | | | | | |
| ☐ | | | | | | |
| ☐ | | | | | | |

[Read] [Delete]

Status As:
- Resolved
- Cancelled
- Open
- Pending
- Mail To ▶ User ID ▶

Figure 19

SYSTEM AND METHOD FOR TOUR OPTIMIZATION

TECHNICAL FIELD

The invention relates to the field of carrier delivery services, and more particularly, to a system and method for optimizing tours by assigning loads to tours in an efficient manner.

RELATED APPLICATIONS

This patent application is related to a series of other patent applications simultaneously filed with the present application on Nov. 20, 2003. Those other patent applications include U.S. patent application Ser. No. 10/716,478 entitled "SYSTEM AND METHOD FOR CREATING TOUR SCHEMATICS" and U.S. patent application Ser. No. 10/716,477 entitled "SYSTEM AND METHOD FOR TOUR PLANNING." This patent application and the noted other patent applications have common inventors and are assigned to a common entity.

BACKGROUND

Producers of goods rely on internal truck fleets and contracted common carriers to carry goods from starting points to destinations. For example, a producer of consumer goods may need to have a load of goods transported from its place of manufacture in the country to a distribution warehouse in a city. In order to reduce transportation costs, producers may rely on internal fleets of vehicles or may contract common carriers to carry the goods on a dedicated tour or a shuttle. A dedicated tour is typically a long haul route comprising a set travel plan of segments between points, where the entire tour is assigned to the producer at a fixed cost. For example, a tour may comprise a route for carrying goods between the points of Memphis, Nashville, Louisville, Nashville, and returning to Louisville. Segments along this exemplary tour include, for example, Memphis-Nashville, Nashville-Louisville, Louisville-Nashville, and Nashville-Memphis.

To reduce inefficiencies, a planner with the producer schedules loads to be placed on a segment of a tour. For example, a planner may see that a load must move between Smyrna, located just outside of Nashville, to Louisville. If the dates, times, and other criteria are appropriate, the planner may place this load on the Nashville-Louisville segment of the tour.

In addition to placing loads on dedicated tours, a planner may place loads on a common carrier that has not been contracted to provide a dedicated tour to the producer. For example, a load traveling outside of a normal delivery segment may be placed with a common carrier because there are no tours that cover the load's segment. Or, a planner may place a load on a common carrier because the common carrier is cheaper than using a segment of a tour. In another example, the planner may place a load on a common carrier because there are no segments of dedicated tours available or that are capable of meeting the loads time requirements.

Complicating matters further for the planners is a third option; producers often have short haul shuttle routes available. A short haul shuttle route, or "shuttle," is like a tour, but is only between two points, where the two points are within a days drive of each other. In a short haul shuttle route, the driver will travel from point A to point B and return from point B to point A on the same day. A shuttle driver may handle more than one load during a day. Planners may elect to place a load on a short haul shuttle route.

An overarching concern for planners is to get all loads to their intended destination in a timely fashion at a minimal cost.

One can see the complexities of creating tours, scheduling tours, and placing loads on tours while trying to maintain an efficient system. Systems exist for assisting planners in managing planning, but these systems are woefully inadequate. For example, a Red Prairie System will attempt to find the cheapest rate to place a load on a common carrier, but Red Prairie does not factor in possible cost savings associated with using a dedicated tour or a short haul shuttle route. In addition, Red Prairie does not automatically place loads on any type of transportation system. Red Prairie performs no analysis of past transportation patterns and does not recommend tours to create.

Nistevo is another system designed to help transportation planners. Nistevo assists planners in creating tours and placing loads on tours. Unfortunately, Nistevo does not do any of these functions automatically. Nistevo merely permits planners to manually create tours and manually place loads on tours. With the daunting challenge of maximizing efficiencies systems where producers may have, for example, 1000 loads a day to transport and over 700 dedicated tours, a better system is needed.

The present invention is directed to overcoming one or more of the above problems and achieving one or more of the above stated goals.

SUMMARY OF THE INVENTION

A method consistent with the present invention includes: receiving first load data about a first load and second load data about a second load; evaluating a fit of the first load data on the first segment and a fit of the second load data on the first segment; evaluating a fit of the first load data on the second segment and a fit of the second load data on the second segment; ranking the relative fits of the first load data and the second load data against the first segment on a first segment list; ranking the relative fits of the first load data and the second load data against the second segment on a second segment list; assigning the load having the highest ranking fit from the first segment list to the first segment and removing that load from the second segment list; and assigning the load having the highest ranking fit from the second segment list to the second segment.

A system consistent with the present invention includes: a memory; and a microprocessor coupled to the memory. The microprocessor is programmed to: receive first load data about a first load and second load data about a second load; evaluate a fit of the first load data on the first segment and a fit of the second load data on the first segment; evaluate a fit of the first load data on the second segment and a fit of the second load data on the second segment; rank the relative fits of the first load data and the second load data against the first segment on a first segment list; rank the relative fits of the first load data and the second load data against the second segment on a second segment list; assign the load having the highest ranking fit from the first segment list to the first segment and removing that load from the second segment list; and assign the load having the highest ranking fit from the second segment list to the second segment.

BRIEF DESCRIPTION OF THE DRAWINGS

The accompanying drawings, which are incorporated in and constitute a part of this specification, illustrate a system consistent with the invention and, together with the description, serve to explain the principles of the invention.

FIG. 11 is a user interface screen of an accent point management screen consistent with the present invention.

FIG. 17 is a user interface screen of a tour workbench page illustrating customization features consistent with the present invention.

FIG. 18 is a user interface screen of a dashboard page consistent with the present invention.

FIG. 19 is a user interface screen of an alerts page consistent with the present invention.

DETAILED DESCRIPTION

Figure 1:
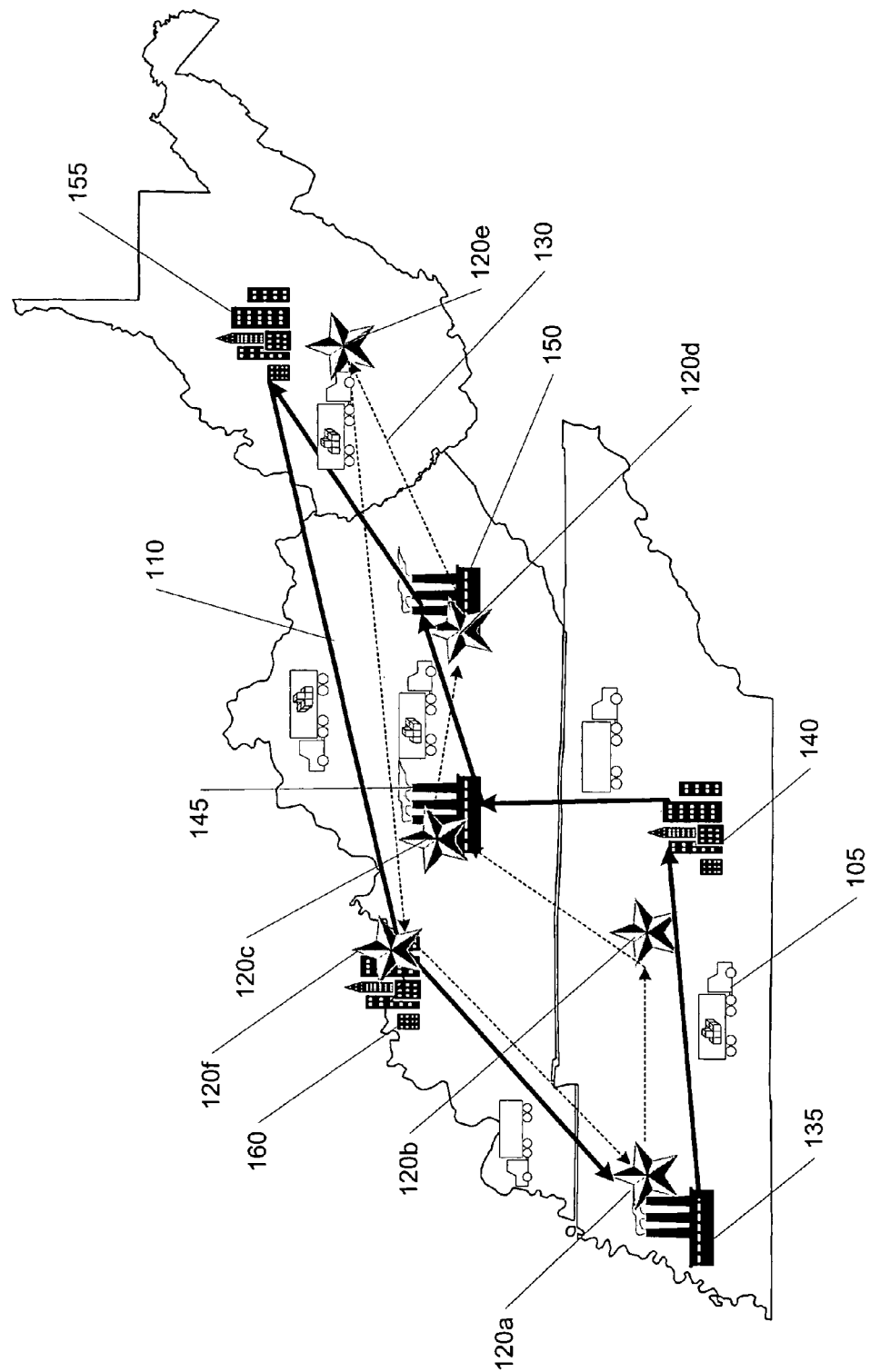
FIG. 1 is an illustration of a schematic and tour generated by a system consistent with the present invention in its operating environment.

Reference will now be made in detail to the present exemplary embodiments consistent with the invention, examples of which are illustrated in the accompanying drawings. Wherever possible, the same reference numbers will be used throughout the drawings to refer to the same or like parts.

The following definitions will facilitate understanding of this specification:

A "Load" is a set of goods that are required to be shipped from an origination to a destination.

An "Accent Point" is a location or region on a map, for example defined by a zip code, which is commonly an origination or destination location.

A "Lane" is a route of travel on a map from a first accent point to a second accent point.

A "Schematic" is a template for a typical delivery route that comprises one or more lanes. Schematics are generally defined by their accent points that define the point to point travel within the schematic. Schematics may have the same starting and ending accent point.

A "Tour" is an instance of a schematic that has been generated to denote a route that an actual delivery vehicle will take. Tours, unlike schematics, contain a start date, an end date, and may have a driver assigned.

A "Segment" is a route of travel from a load's origination location to a load's destination location on a tour. A segment may correspond to a lane if the segment's origination and destination locations correspond to a lane's respective accent points.

A "Shuttle" is a tour between only two accent points, usually representing the same location. Generally, the accent points may be less than a day's drive from each other or in the case of same location may represent one day's worth of drive time. In a typical shuttle, a driver may drive from the first accent point to a number of intermediate points returning to the second accent point at the end of the day.

Systems and methods consistent with the present invention may provide the following functionality: tour analysis; schematic optimization; and automatic tour building. In tour analysis, recent load history may be analyzed based on data saved in data sources. The tour analyzer may create optimal profitable routes using recent load history. It compares the dedicated cost of an optimal tour (the cost to place the loads on dedicated carriers) against the common carrier cost of the load assigned to the tour (the cost to place the loads on common carriers). By analyzing these optimal tours, reports may be generated noting opportunities to reduce costs by generating schematics for dedicated tours where costs savings would be achieved by placing loads on the dedicated tours instead of on common carriers. Savings may be forecast into the future based on the optimized tour's load data.

Where the tour analyzer notes an opportunity for savings, the schematic optimizer may utilize the same data sources to recommend and generate schematics. The schematic optimizer may identify potential lanes based on optimized tours using load history data and generate a potential, optimized schematic of lanes. The potential, optimized schematic may be checked for legality based on a set of business rules (to be discussed later). If the potential, optimized schematic meets the business rules, the potential, optimized schematic may be offered to a traffic planner for implementation.

A major portion of the tour optimization and planning system consistent with the present invention is the automatic tour builder. The automatic tour builder may take a schematic, create a tour as an instance of the schematic, and populate the tour with one or more loads. Loads may be populated on the tour in order to optimize a tour characteristic, for example cost savings.

FIG. 1 is an illustration of a schematic and tour generated by the automatic tour building system consistent with the present invention in its operating environment. In order to better illustrate the operation of the present invention, FIG. 1 illustrates a schematic 130 and a tour 110. The schematic 130, as previously defined, is a template comprising a list of accent points defining a set of lanes that define a tour. Schematic 130, for example, is defined by a series of accent points 120a-f. Schematic 130 may have been manually created, automatically created by, for example, the schematic optimizer, or may be created based on a combination of automatic and manual operations. The accent points 120a-f may be defined by a general geographic area, for example Memphis 120a, or by a zip code. The accent points 120a-f may be determined based on a weighting of clustered loads delivered or originated from around that map location. Accent points may be manually created based on a traffic planners input or may be created automatically as the systems of the present invention monitor a threshold level of origination or destination traffic located about a point.

While in an exemplary embodiment of the present invention zip codes may be used to define accent points 120*a-f,* to facilitate this discussion city names will be used. Schematic 130 comprises the list of the following accent points: Memphis 120*a,* Nashville 120*b,* Louisville 120*c,* Lexington 120*d,* Bleakly 120*e,* Farmdale 120*f,* and returning to Memphis 120*a.* Lanes within schematic 130 include, for example, Memphis to Nashville, Nashville to Louisville, and Louisville to Lexington.

Because schematics are designed as templates, they generally do riot include specific start dates, end dates, driver, or carrier information. Once load information is generated, a traffic planner or the automated tour building system may generate one or more tours based on the schematic. Tour 110 is an instance of schematic 130. In another words, tour 110 is generated using schematic 130 as a template. Tour 110 may have a designated start date, end date, driver, and carrier. Tour 110 may be populated with one or more loads, where each load has an origination and a destination location. For example tour 110 may be populated with the following load list:

| Load Identifier | Origination | Destination |
|---|---|---|
| 101 | West Memphis 135 | Smyrna 140 |
| 102 | Lousville 145 | Lexington 150 |
| 103 | Lexington 150 | Charleston 155 |
| 104 | Charleston 155 | Farmdale 160 |

Notice that the origination and destination locations may not, and likely will not, exactly correspond to each accent point. The automatic load builder places loads to optimize cost savings and loads will not necessarily always correspond to an accent point. In addition, some amount of "deadhead" may occur where loads are not available for placing onto a tour, resulting in some segments of a tour being empty. In addition, as will be seen, loads may not become available until the start of a tour with further loads being placed onto a tour as the loads are placed into the system. Loads may be moved around tours until the loads are locked. A load is locked when it may not be moved or removed from a tour to which it is assigned. Loads may be locked, for example, by the traffic planner, by the system, or when the load is picked up.

The automatic tour builder of the present invention may be run on a periodic basis, for example once a day or twice a day, with loads being shuffled onto and off of a tour's load list each time the tour builder is run. Or, the automatic tour builder may be running continuously, whereby any time there is a triggering event, for example a new load placed into the system, the automatic tour builder is run and loads are rescheduled onto tours. This latter system continuously monitors loads and tours, working to optimize tours on a continuous basis.

Figure 2:
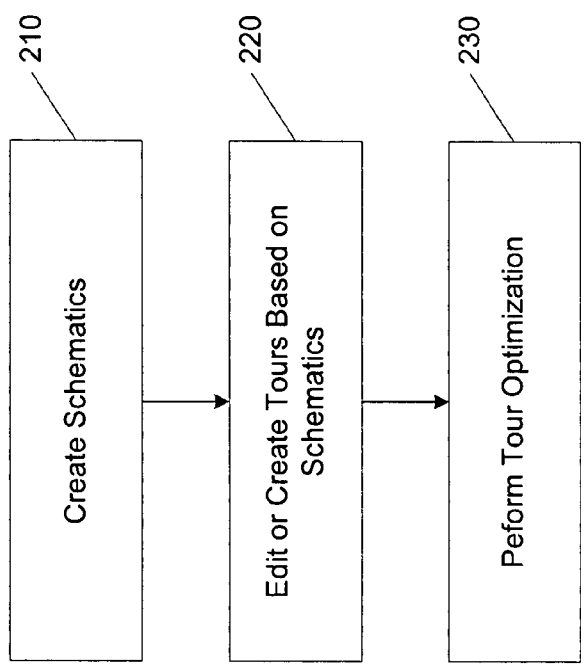
FIG. 2 is a flowchart of an automatic tour building system consistent with the present invention.

FIG. 2 is a flowchart of the automatic tour building system consistent with the present invention. At stage 210, schematics may be created. As previously mentioned, schematics may be automatically created by the schematic optimizer at a previous stage or schematics may be created at stage 210 by facilities of the automatic tour building system. At stage 220, one or more tours may be created or edited based on the schematics. Tours may be manually created or automatically created. At stage 230, tour optimization may be performed. Tour optimization places one or more loads on a tour or a shuttle.

Figure 3:
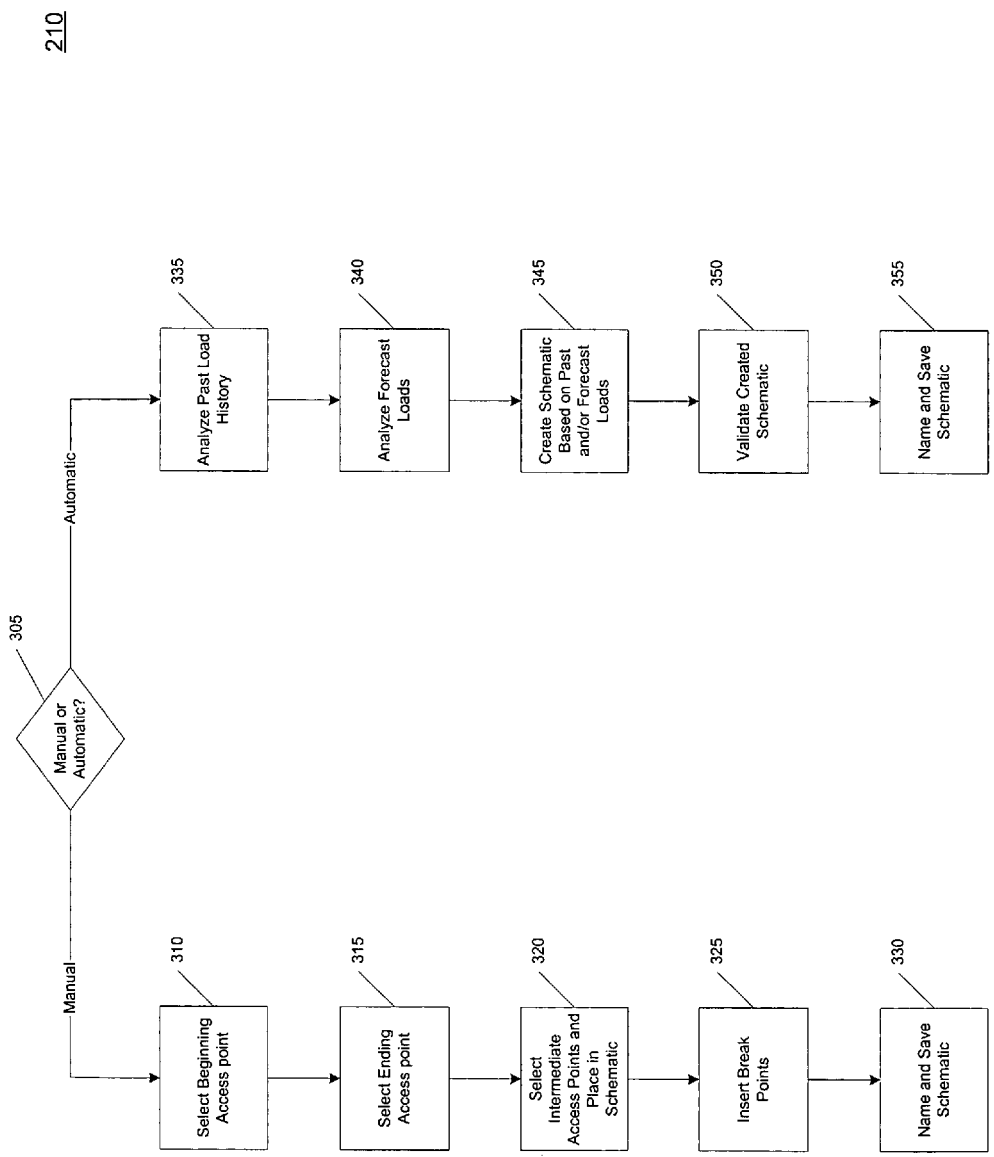
FIG. 3 is a flowchart of a schematic creation process consistent with the present invention.

FIG. 3 is a flowchart of a schematic creation process consistent with the present invention. At stage 305, the user, for example a traffic planner, may select whether she wants a manual or automatic creation of a schematic. If manual, at stage 310, the user selects a beginning accent point. The accent point may be manually entered by the user or selected from a list of accent point already in the system. The user may elect at any point in time in the schematic creation process to create a new accent point, typically defined by a zip code. In addition, the system may automatically create accent points based on clustered locations of a threshold level of origination or destination activity.

At stage 315, the user may select an ending accent point, typically the same accent point as the beginning accent point. At stage 320, the user may select intermediate accent points. Break points, points in the accent point list where the driver must take a break, may also be inserted into the schematic at stage 320. At stage 330, the schematic may be named and saved. Prior to saving, the schematic may be checked against a set of business rules to insure compliance. Business rules may comprise, for example, rules regarding: the length of time or, distance that a driver can stop without a break; a maximum or minimum set of miles for a schematic; or any other rule that a traffic planner may want to impose on a schematic.

Should the user elect an automatic creation of a schematic at stage 305, at stage 335 the system may analyze past load and tour history to determine possible optimized schematics. This is similar to the analysis that would occur in the previously described schematic optimization process. Past loads may be analyzed based on dedicated and common carrier rates, with schematics generating a threshold level of savings being proposed by the system. At stage 340, the analyzer may also examine forecast loads in order to propose optimized schematics. Forecast loads may be loads forecast by a traffic planner or by the system based on load history.

At stage 345, schematics may be created based on past or forecast loads. Like the manual process, the automated process may create accent points as required by the system based on clusters of origination and destination locations. Because this is an automated system, at stage 350 the proposed schematics are checked against the set of business rules. Should they pass the business rules, the schematics are proposed to the user for naming and saving.

Figure 4:
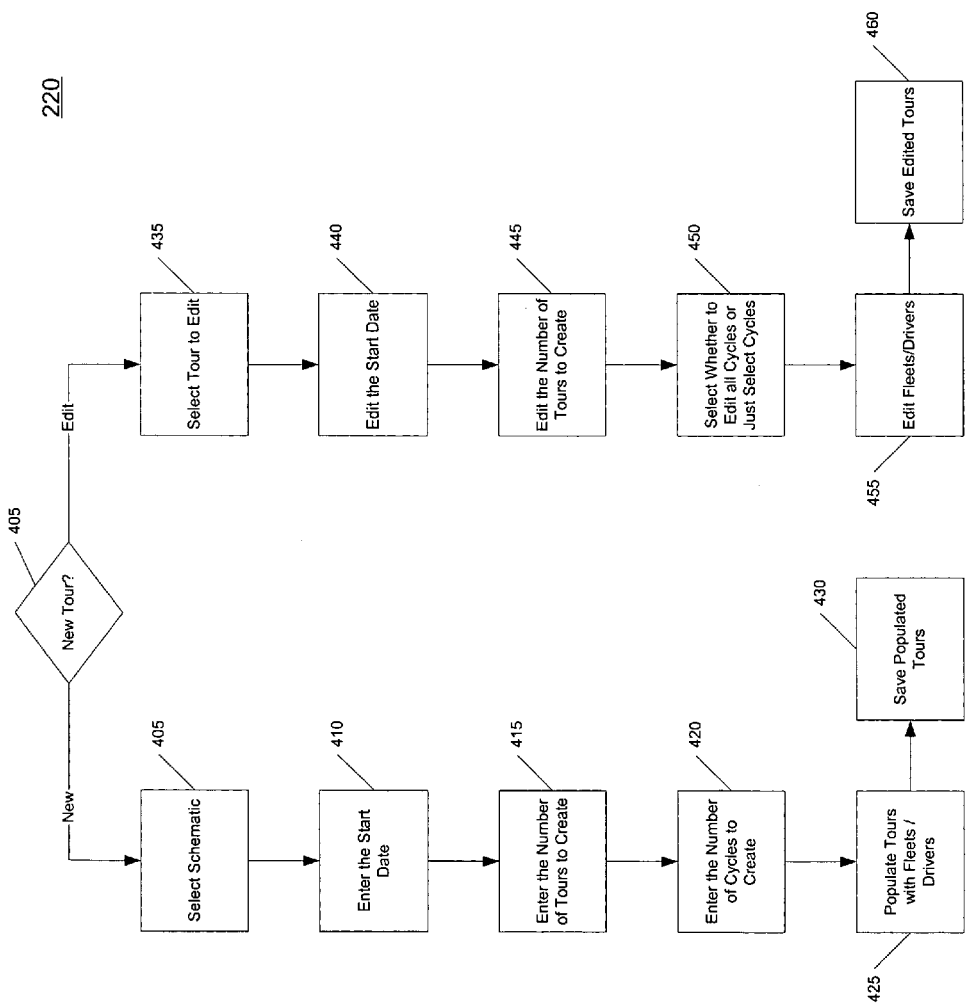
FIG. 4 is a flowchart of a tour creation and editing process consistent with the present invention.

FIG. 4 is a flowchart of a tour creation and editing process consistent with the present invention. At stage 405, the user selects whether to create a new tour or to edit an existing tour. If the user wants to create a new tour, at stage 405, the user selects a schematic. The user may enter the schematic name or be presented with a list of schematics. The list of schematics may be filtered by any characteristics that the user selects, for example, schematics may be displayed that only contain certain selected accent points.

Once the user selects a schematic, at stage 410, the user enters a start date for the tour at stage 410. At stage 415, the user selects the number of tours to create having that start date. For example, a user may select to create a number of tours having the same start date for a heavily trafficked route. At stage 420, the user may select the number of cycles of the tour to create. The user may want to cycle a tour a number of times. For example, a user may elect to cycle a given one week tour for the next quarter or 13 weeks or 13 cycles. At stage 425, the user may, now or at a later point in time, populate the tour with selected drivers and fleets. At stage 430, the user may save the populated tour.

The user, at stage 405, may also elect to edit an existing tour. At stage 435, the user selects the tour to edit. At stage 440, the user may elect to edit the start date of the tour. At stage 445, the user may elect to edit the number of tours to create. More or less tours may be created or deleted, respectively. At stage 450, the user elects whether his current edits apply to just this cycle of the tour, all cycles, or selected cycles. At stage 445, the user may elect to edit the drivers or fleets populating the tours. At stage 460, the user may save his edits.

Figure 5:
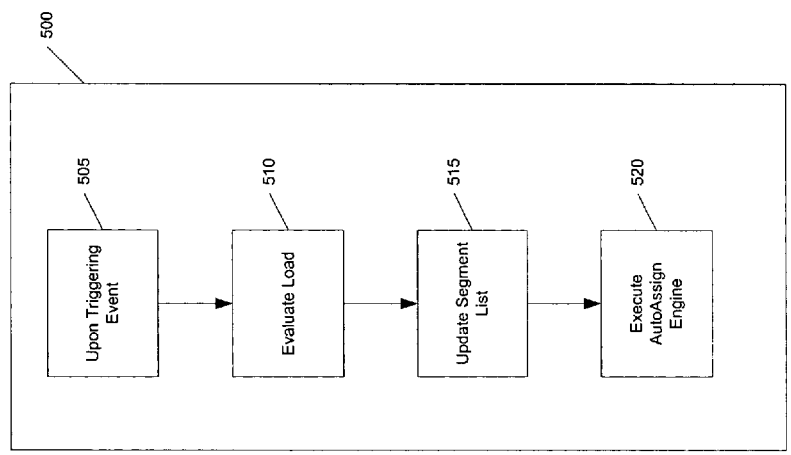
FIG. 5 is a flowchart of a tour optimization process consistent with the present invention.

FIG. 5 is a flowchart of a tour optimization process 230 consistent with the present invention. Several different methods may be used within tour optimization process 230, including: single tour optimization; multi-tour optimization; single segment best fit; multi-segment best fit; shuttle; or scratch.

Single tour optimization examines all available loads in the system and places loads on a tour to optimize the tour. Optimization is performed on a tour by tour basis. For example, if there are ten tours the tour optimization process will optimize the first tour by placing loads on the first tour to achieve an optimum first tour. This is performed regardless of the remainder of the tours. Once the loads have been placed on the first tour, they are removed from possibility of consideration by the remainder of the tours. Each remaining tour is then independently optimized in consecutive or user designated order. In single tour optimization, consideration is not paid to overall system optimization.

Multi-tour optimization examples loads in the system and places loads on a tour to optimize all tours. While optimization is performed on a tour by tour basis, consideration is paid to achieving efficiencies across all tours as a whole. Loads originally placed on a first tour, for example, may be shifted to a second tour, if shifting the load to the second tour will optimize the entire set of tours.

Certain loads may fit best on a short-haul shuttle tour. Shuttle tour optimization places loads on a shuttle on a segment by segment basis to optimize the shuttle. Placing the loads on shuttle tours may optimize loads remaining after standard optimization of tours based on standard schematics. Or, loads may be designated as shuttle loads for being placed only on shuttles.

Scratch optimization creates tours from scratch based on available loads or forecast loads. These tours, which are not created from schematics, are then loaded with loads. Scratch optimization is a method of creating tours "on the fly" on routes that would benefit from a dedicated tour over use of a common carrier, but typically where the route is not traveled on a regular basis.

Returning to FIG. 5, FIG. 5 is a flowchart of a tour optimization process 230 consistent with the present invention. More particularly, FIG. 5 is a flowchart of single tour best-fit optimizer 500. Best-fit optimizer 500 places loads on segments in order to optimize segments, regardless of optimization of any single tour or optimization of all tours. It is one of the fastest optimization methods described and is, particularly well-suited to continuous optimization runs. In general, best-fit optimizer 500 builds a list of segments of available tours and ranks the list of available loads against each segment. The top available load for each segment is selected and placed on the segment. This continues until each segment has a load assigned to it, if one is available and meets business rules. In this way, tours are populated and loads tendered or assigned on a segment by segment basis.

At stage 505, a triggering event occurs that initiates best-fit optimizer 500. Triggering events may be, for example: a new load appearing on the system; a load having a change in priority status; a load is locked by a user or a load is tendered; a delivery date or a load date of a load is changed; a load is cancelled; a new tour is created; a tour is changed (for example, a new segment is added); or a segment is changed. In addition, best-fit optimizer 500 may be triggered to run continuously for a period of time or only upon a triggering event.

At stage 510, loads in the system may be evaluated. Evaluation stage 510 may evaluate each load against each segment to determine a measure of fit. For example, loads may be evaluated against segments to determine a savings factor based on the saving of placing the load on a dedicated tour versus a common carrier.

At stage 515, segment lists are updates. Each segment of each tour has a ranked list of available loads. The more desirable loads may be placed at the top of the list. Loads may be ranked by best-fit according to the following criteria: load priority; savings; deadhead miles; delivery date; load creation date. Loads with higher assigned priorities takes precedence over all other loads. Loads with the greatest savings are the next ranking criteria. Loads with the lowest deadhead miles are the next criteria. Loads with the earliest delivery date are next, followed be loads of the earliest creation date within the system. For example, the following may be a load list for a segment, for example Segment 1 of Tour 1:

| Load ID | Priority | Savings | DeadHead | Delivery Date | Creation Date |
|---------|----------|---------|----------|---------------|---------------|
| 837 | 1 | 78 | 40 | Feb. 2, 2003 | Jan. 15, 2003 |
| 765 | 1 | 60 | 35 | Feb. 2, 2003 | Jan. 15, 2003 |
| 543 | 1 | 50 | 60 | Feb. 1, 2003 | Jan. 12, 2003 |
| 354 | 0 | 100 | 5 | Jan. 31, 2003 | Jan. 15, 2003 |
| 356 | 0 | 20 | 73 | Jan. 31, 2003 | Jan. 15, 2003 |
| 938 | 0 | 20 | 100 | Jan. 31, 2003 | Jan. 15, 2003 |

The load lists are updated based on the results of evaluation process 510.

At stage 520, the autoassign engine is run to assign the loads to the segments.

Figure 6:
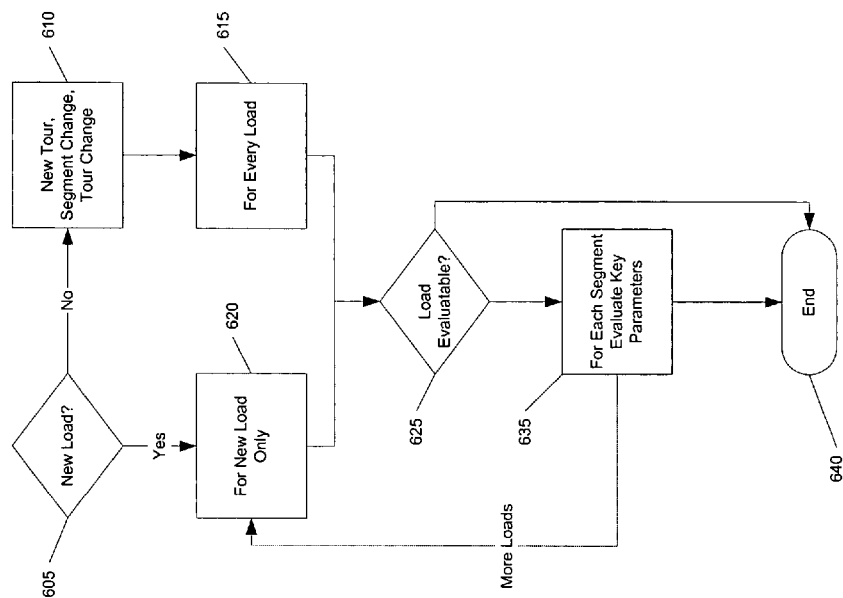
FIG. 6 is a flowchart of a load evaluation process consistent with the present invention.

FIG. 6 is a flowchart of the load evaluation process 510 consistent with the present invention. At stage 605, the system checks to see whether the load evaluation process has been triggered because a new load has been placed in the system. If a new load has been placed in the system, or a load change has occurred, at stage 620, the load evaluation process needs to only be run for the new or changed load. If a trigger has occurred for another reason, for example, a new tour, a segment change, or a tour change (stage 610), then at stage 615 load evaluation process may be performed for every load.

At stage 625, a test is made to determine whether the load can be evaluated. For example, a load that is already assigned and locked (for example a traffic planner has locked the load or the load has already been placed on a vehicle) then the load does not need to be evaluated. Loads may also not be evaluated, for example, if the load is a shuttle type load. If the load can not be evaluated, the load evaluation process ends if only a single load is being evaluated. If multiple loads are being evaluated the next load is selected and flow returns to stage 625.

If the load is able to be evaluated, at stage 635 the load is evaluated against one or more segments for one or more key parameters.

Figure 7:
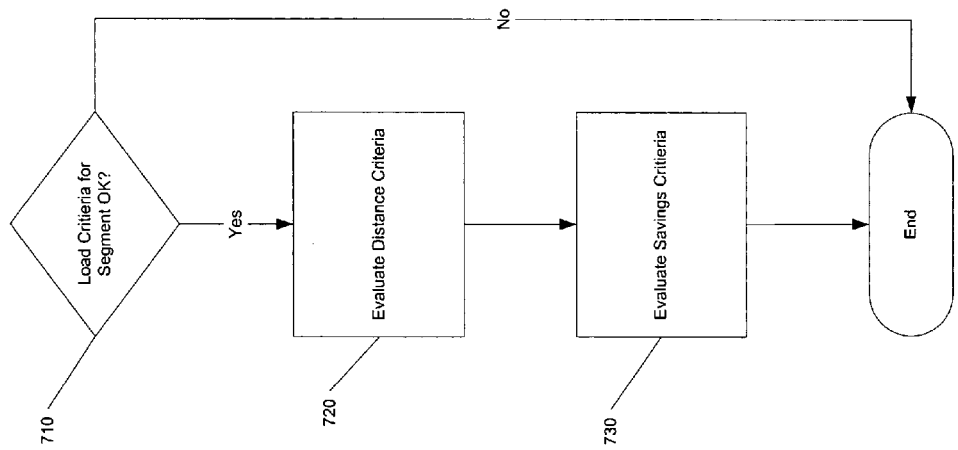
FIG. 7 is a flowchart of a segment evaluation process consistent with the present invention.

FIG. 7 is a flowchart of a segment evaluation process 635 consistent with the present invention. For a load to be available for a given segment, the load must meet certain time and distance criteria. Stage 710 checks time criteria. Time criteria may include the load's latest ready delivery date and the load's latest load ready date. The load's latest ready delivery date must be less than or equal to the segment's estimated end date. The load's latest load ready date must be greater than or equal to the segment's estimated start date.

The load's distance criteria is evaluated at stage 720 and may include, for example: segment deadhead criteria; load deadhead criteria; and tour mileage criteria. The load should fit within the segment's deadhead criteria. Each segment may have a maximum number of deadhead miles, which are miles between the lane's starting accent point and the load's origination location added to the miles between the lane's destination accent point and the load's destination location.

The load should also fit within the tour's maximum deadhead miles. This may be checked by estimated a tour's deadhead miles for all previous segments and the current deadhead miles for this proposed segment, summing them, and evaluating if the sum is less than the tour's maximum deadhead miles.

The load should also fit within the tour's range of minimum and maximum miles. This may be checked by estimated the tour's miles added to all the previous segment miles added to the average miles in each remaining lane.

If the load meets the time and distance criteria, the cost savings is calculated for the load on the particular segment being evaluated at stage 730. The cost savings is equal to the common carrier cost for carrying the load minus the dedicated cost for carrying the load. The common carrier cost for carrying the load is the total miles from origination location of the load to the destination location of the load times the common carrier rate per mile. The dedicated cost for carrying the load is the cost for all load mileage added to the deadhead mileage times the dedicated rate. Costs savings for each load against each segment may be performed in this manner. These cost saving are used in stage 515 to update the segment list for each segment.

Figure 8:
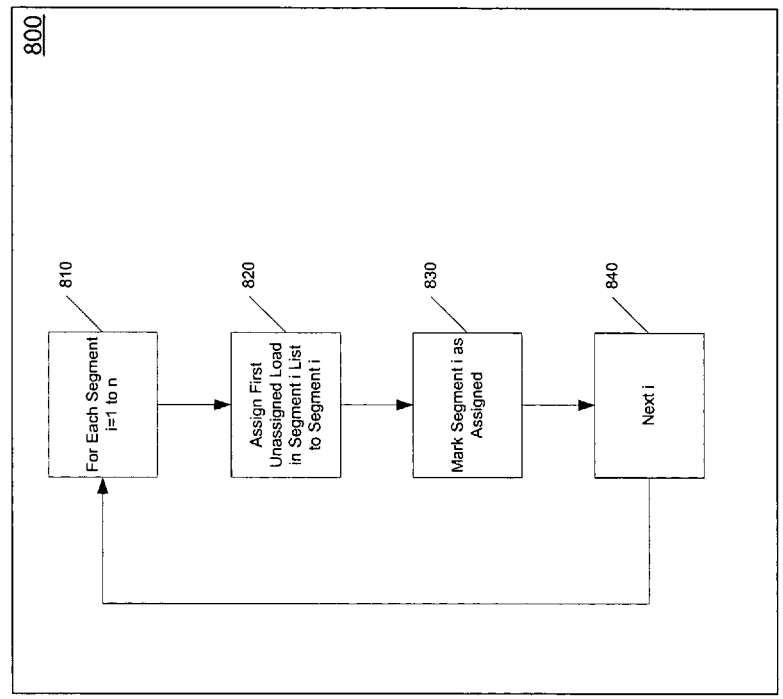
FIG. 8 is a flowchart of an autoassign process consistent with the present invention.

FIG. 8 is a flowchart of an autoassign process consistent with the present invention. For each segment of all tours (for example 700 tours of five segments each would yield 3500 segments for evaluation and list generation), at stages 810 through 840 best-fit autoassign is performed. The load that best fits a segment is the load at the top of the segment list. At stage 820, the first unassigned load from segment I list is assigned to segment I. At stage 830, this first unassigned load that has been selected is marked as assigned. At stage 840, flow continues to the next segment. In this way, each segment picks the best available load from the segment load list.

Other features of the present invention include a break deadhead feature. When loads in adjoining segments are locked, the Break Deadhead routine may create a new available segment between the destination location of the first load and the origination location of the second load. This new segment may then be populated with a load on subsequent runs of the autoassign engine.

In addition, a robust web-driven interface may be provided as a front-end to the systems and methods of the present invention. Certain features of the present invention will be discussed in reference to these user interface screens.

Figure 9:
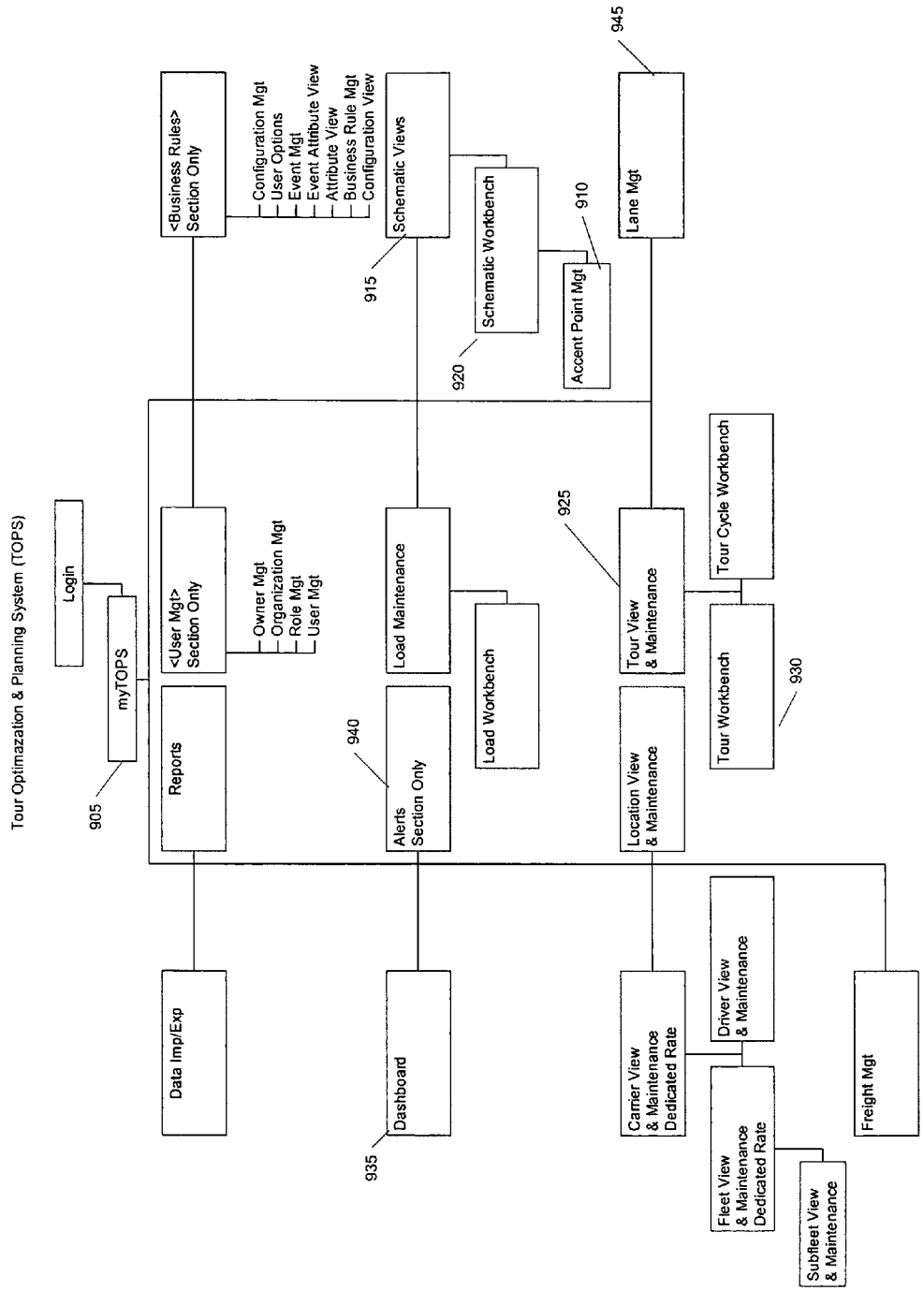
FIG. 9 is a chart of a user interface for use with the tour optimization and planning system consistent with the present invention.

FIG. 9 is a chart of a user interface for use with the tour optimization and planning system consistent with the present invention. The user, following logging in, may be presented with an overview screen 905. The user may access schematics for viewing on schematic views screen 915 and edit and create schematics at schematic workbench screen 920. Accent points may be managed at accent point management screen 910, and lanes may be managed at lane management screen 945. Tours may be viewed and maintained at tour view and maintenance screen 925 and tours edited and worked upon at tour workbench 930. Alerts may be displayed on alerts screen 940 and a dashboard screen 935 may display useful information.

Figure 10:
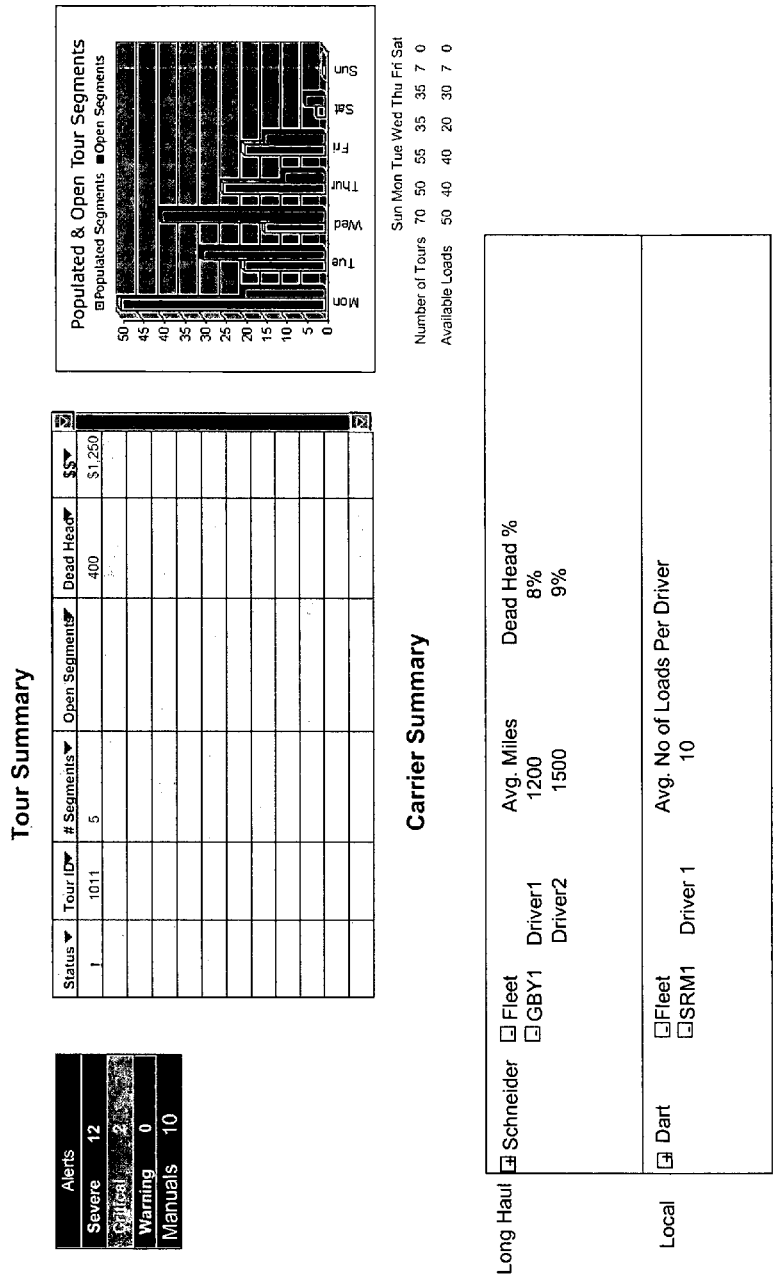
FIG. 10 is a user interface screen of an overview page consistent with the present invention.

FIG. 10 is a user interface screen of an overview page 905 consistent with the present invention. Overview page 905 may display a summary of all of the tours for which a particular user is responsible. It may also display a graph of populated tour segments and open tour segments. In addition, a carrier summary may be displayed, listing long haul carriers and local carriers. Alerts may also be displayed on this page.

Figure 11:
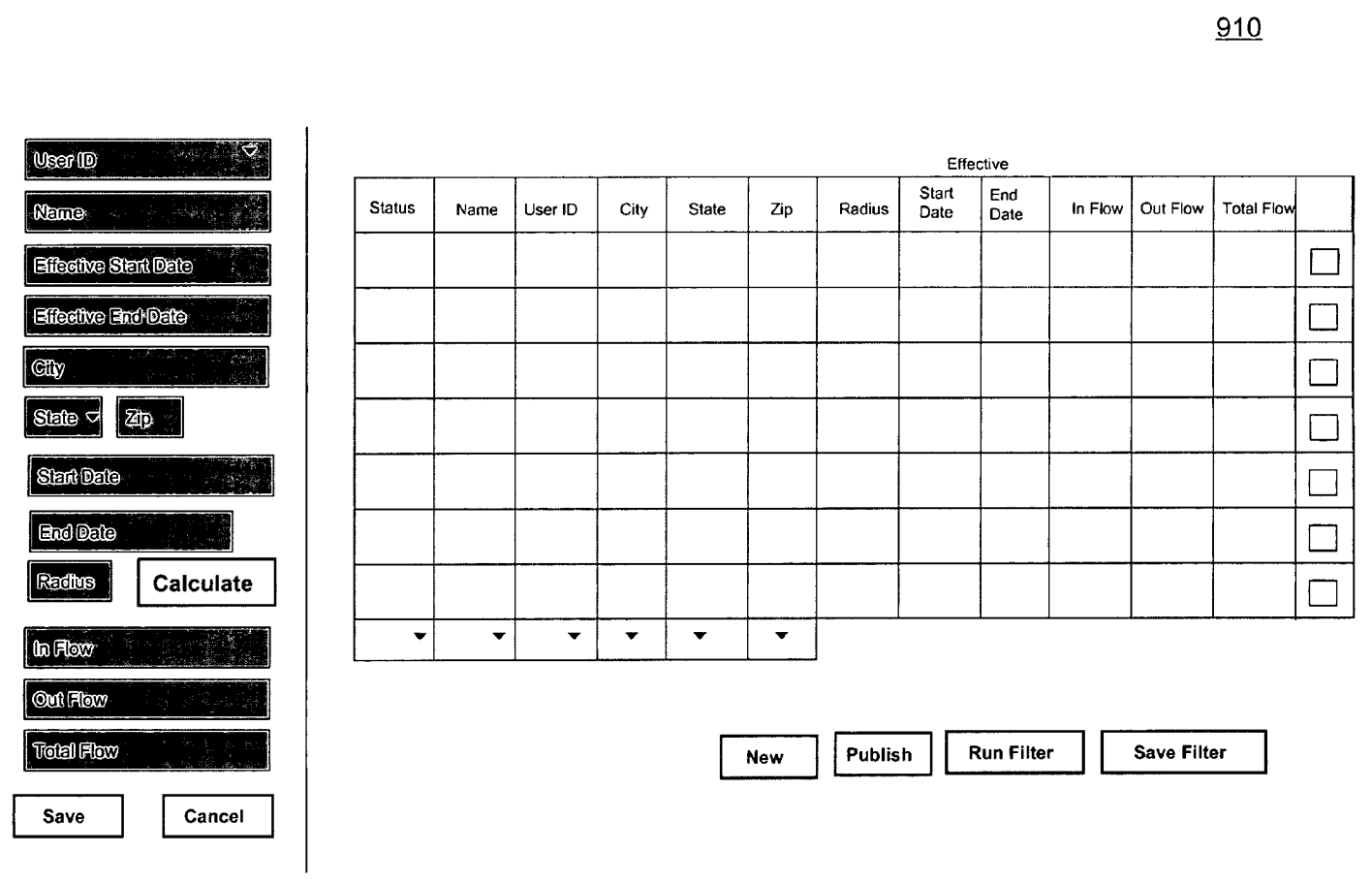

FIG. 11 is a user interface screen of an accent point management screen 910 consistent with the present invention. The accent point management screen may list all accent points, or accent points by filter criteria. An accent point record may include the following fields: status, name, creator user id, city, state, zip code, radius of the accent point, effective start date of the accent point, effective end date of the accent point, historical inflow of loads to the accent point, historical outflow of data to the accent point, and total flow in and out of the accent point. Accent points may also be created using the left hand side of the screen and a series of pull down menus. When creating an accent point, a user may elect to calculate in flow and out flow based on historical data prior to saving the accent point. For example, a user may elect to change the radius of an accent point to see how this effect the flow numbers. Once an accent point is created, it may need to be published in order for it to be available to users of the system. Accent points may also be edited on this screen.

Figure 12:
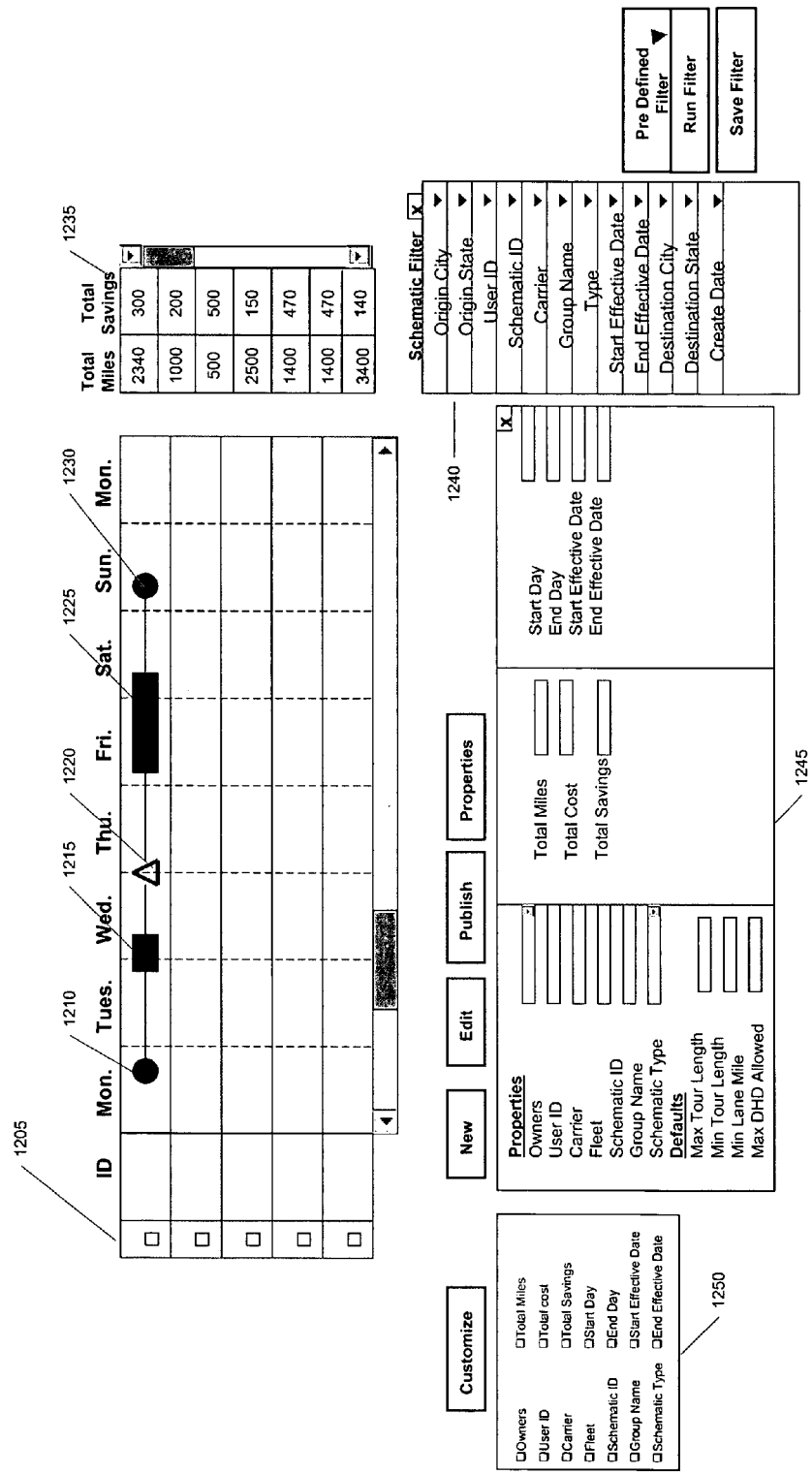
FIG. 12 is a user interface screen of a schematic view screen consistent with the present invention.

FIG. 12 is a user interface screen of a schematic view screen 915 consistent with the present invention. Schematic view screen 915 may comprise a number of features to allow convenient viewing of schematics. A schematic list 1205 may list one or more available schematics based on a set of filter criteria 1240. A schematic record may comprise one or more of the following fields 1245: two or more accent points, including a starting accent point and an ending accent point; an owner; a creating user id; a carrier id; a fleet id; a schematic id; a group name to which the schematic belongs; a schematic type; a maximum tour length in miles; a minimum tour length in miles; a minimum lane miles; a maximum deadhead allowed; an effective start date, and an effective end date. The filter may filter by any of the fields alone or in combination.

The fields displayed in schematic field box 1245 may be customized in customization box 1250. Schematic list 1205 may show a schematic, including its starting accent point 1210 and ending accent point 1230, any intervening accent points 1220, and any breaks 1215, 1225. Selecting a schematic, for example by clicking on the schematic, may bring up schematic workbench 920.

Figure 13:
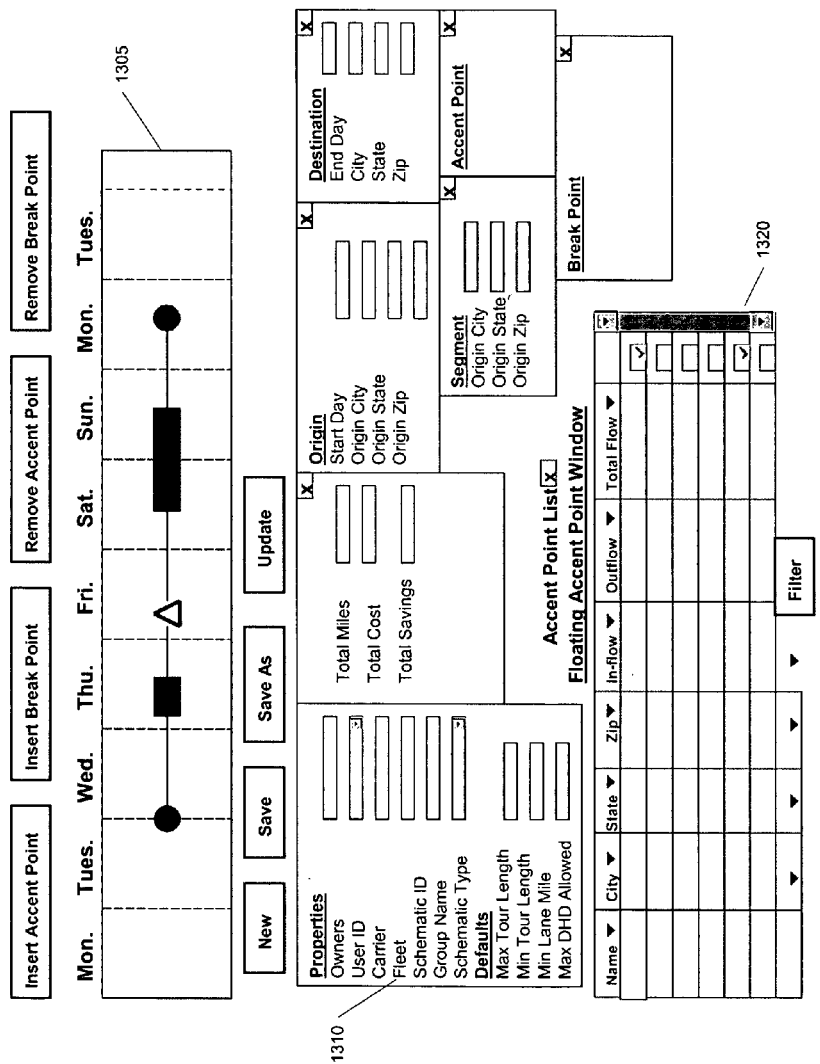
FIG. 13 is a user interface screen of a schematic workbench screen consistent with the present invention.

FIG. 13 is a user interface screen of a schematic workbench screen 920 consistent with the present invention. Users may create or edit schematics from this screen. Schematic work window 1305 illustrates the schematic being assembled. Accent points and break points may be "drag and dropped" to appropriate locations. A properties window 1310 permits editing of properties with appropriate fields having pull-down menu options. Accent point window 1320 provides an optionally filtered view of available accent points for selecting or dragging.

Figure 14:
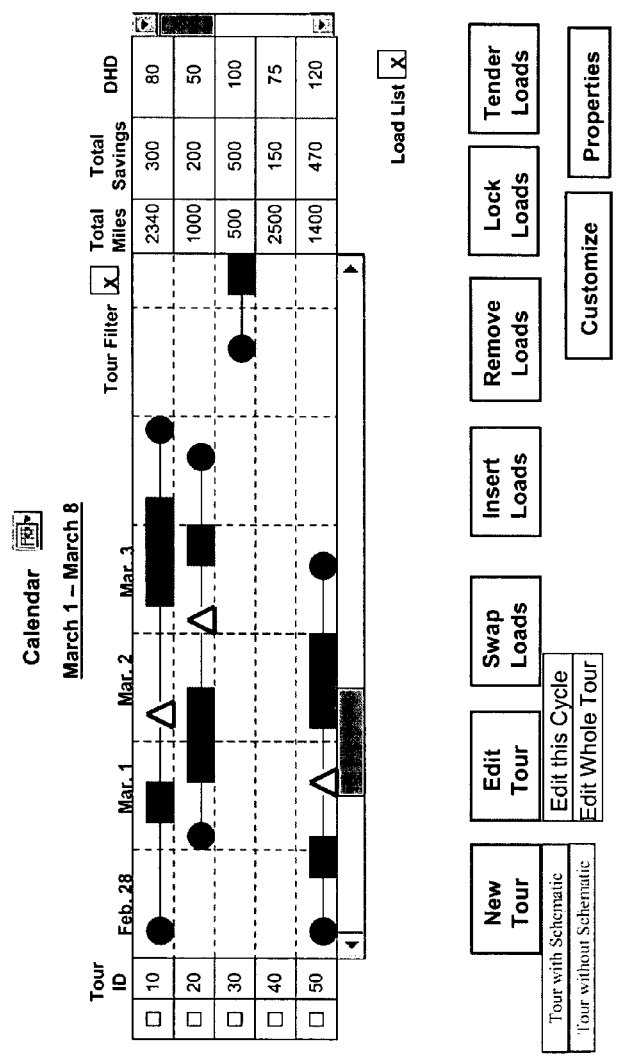
FIG. 14 is a user interface screen of a tour view and maintenance page consistent with the present invention.

FIG. 14 is a user interface screen of the tour view and maintenance screen 925 consistent with the present invention. Tours may be viewed and loads inserted, removed, swapped, locked, or tendered.

Figure 15:
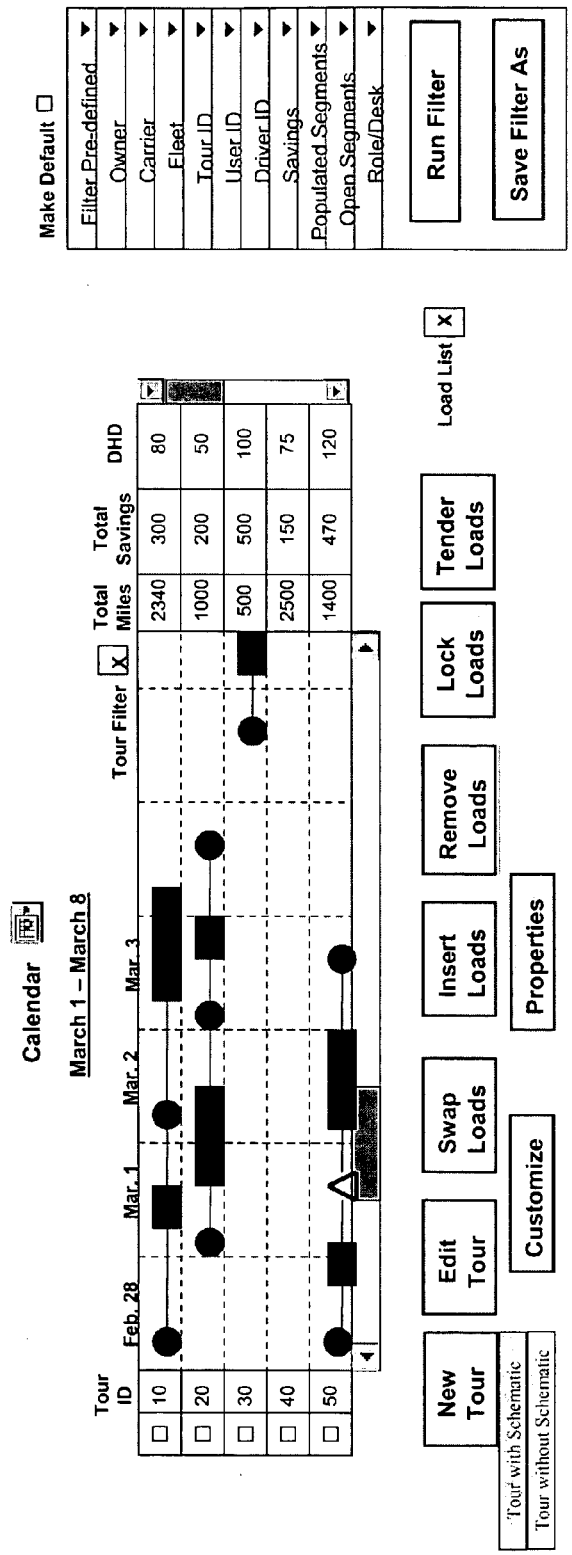
FIG. 15 is a user interface screen of a tour view and maintenance page illustrating filter features consistent with the present invention.

FIG. 15 is a user interface screen of the tour view and maintenance page 925 illustrating filter features consistent with the present invention. Like many other screens, tours may be filtered by one or more fields within the tour. Fields include, for example: owner, carrier, fleet, tour id, user id, driver id, savings, populated segments, open segments, or role.

Figure 16:
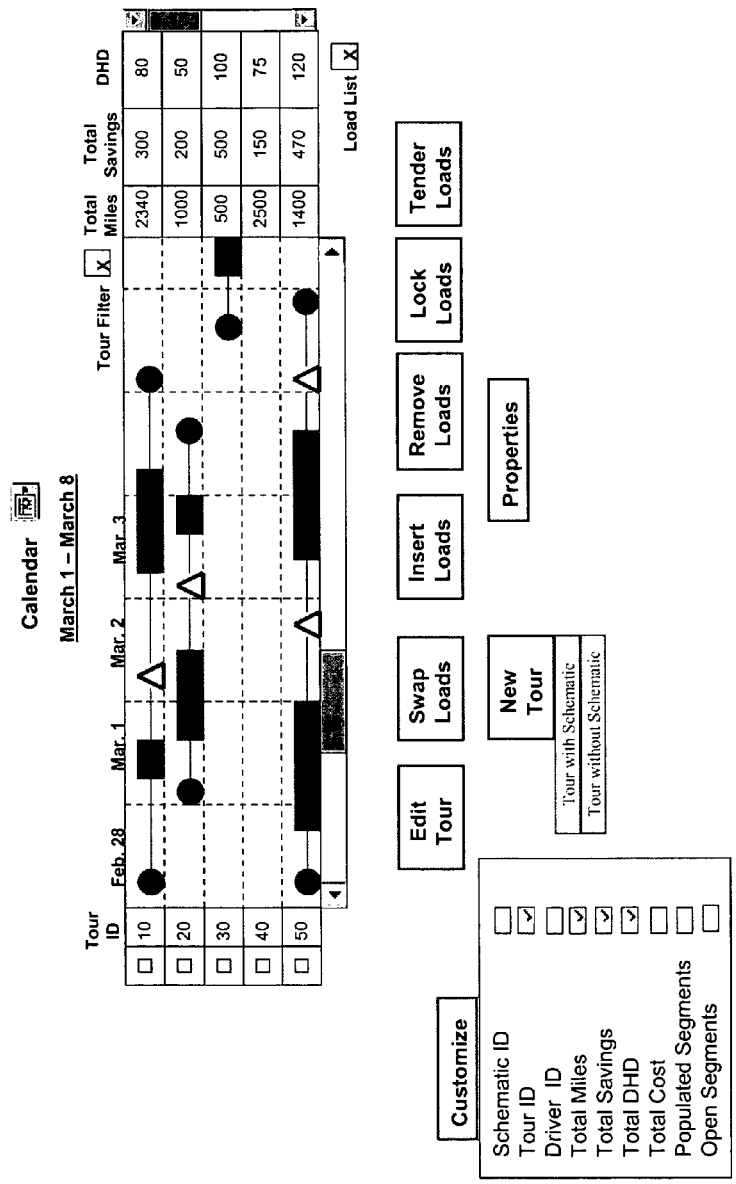
FIG. 16 is a user interface screen of a tour view and maintenance page illustrating customization features consistent with the present invention.

FIG. 16 is a user interface screen of the tour view and maintenance page 925 illustrating customization features consistent with the present invention.

Figure 17:
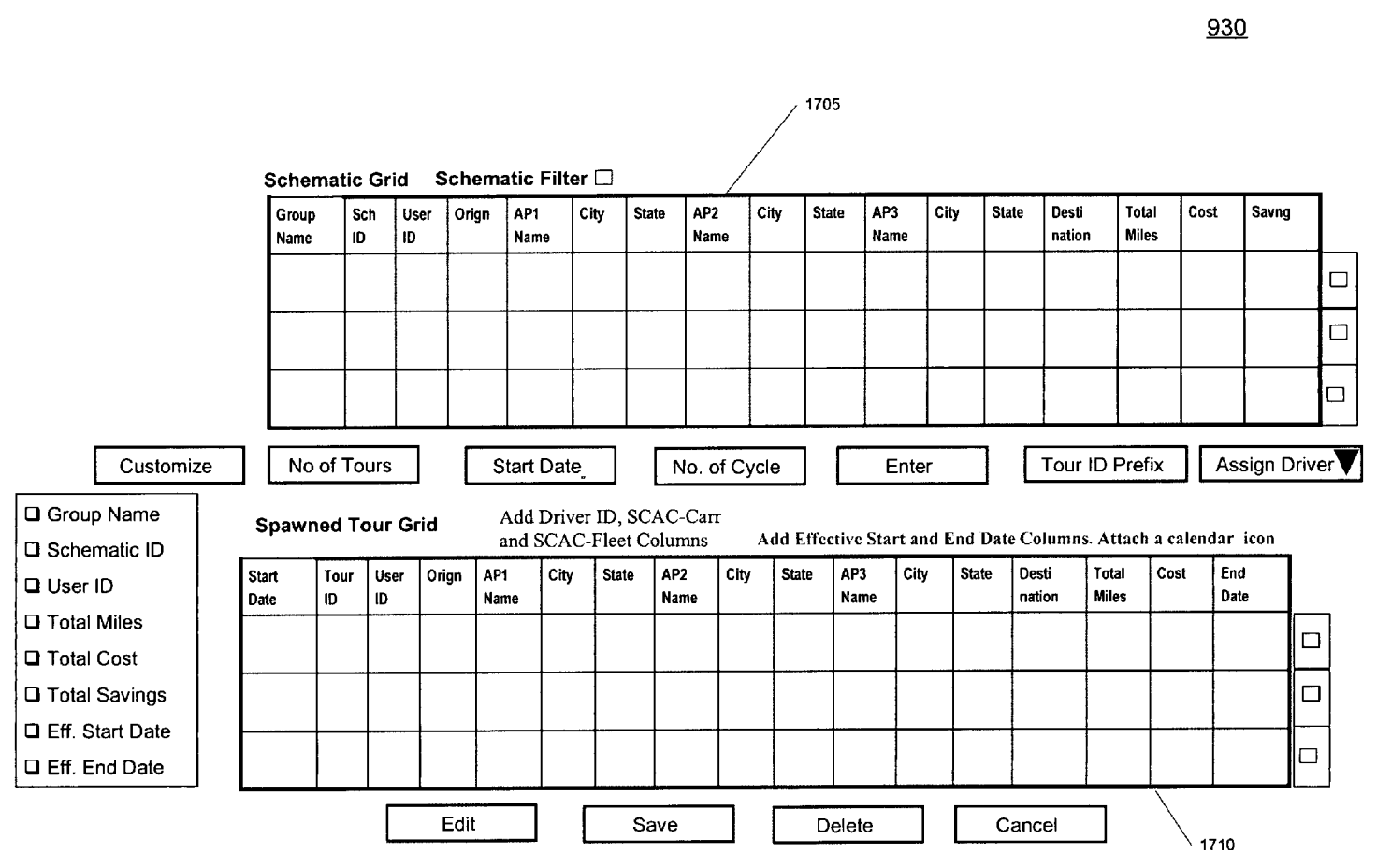

FIG. 17 is a user interface screen of a tour workbench screen 930 illustrating customization features consistent with the present invention. Schematics may be displayed in schematic grid 1705, either all or filtered. Schematics may be selected by the user from schematic grid 1705 and spawned into one or more tours or cycles of tours in spawned tour grid 1710. Pull down menus may be used to enter tour fields. Tour fields may include, for example: start date, tour id, user id, origin, one or more accent points, a destination, a driver, and a fleet.

FIG. 18 is a user interface screen of a dashboard page 935 consistent with the present invention. The dashboard may be customized to provide a quick-glance overview of the status of tours for which a user is responsible. The dashboard is fully customizable.

FIG. 19 is a user interface screen of an alerts page 940 consistent with the present invention. The alerts page may display a series of alerts based on user defined alert criteria. A user may address an alert to insert an action taken or current status in association with an alert.

Figure 20:
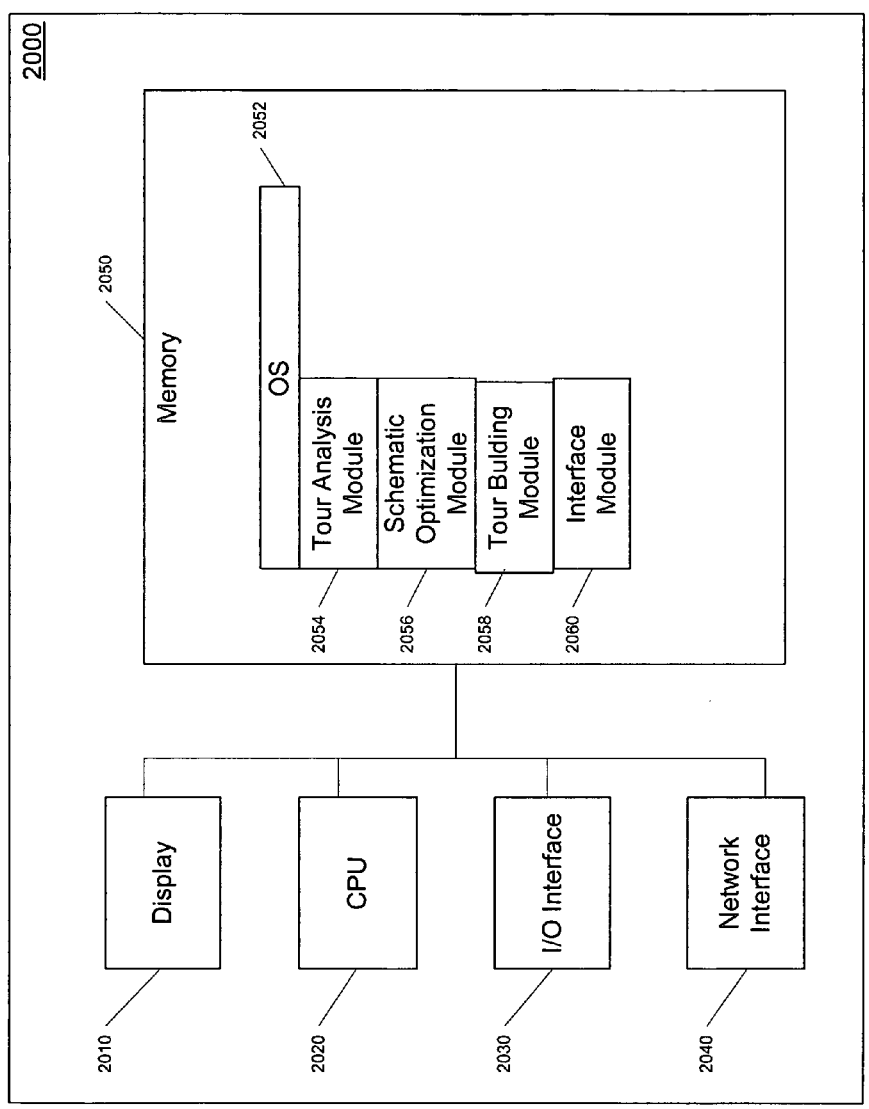
FIG. 20 is a block diagram of a tour optimization and planning system 2000 consistent with the present invention.

FIG. 20 is a block diagram of a tour optimization and planning system 2000 consistent with the present invention. As illustrated in FIG. 20, a system environment of an a tour optimization and planning system 2000 may include a display 2010, a central processing unit 2020, an input/output interface 2030, a network interface 2040 and memory 2050 coupled together by a bus. Tour optimization and planning system 2000 is adapted to include the functionality and computing capabilities to perform one or more of the following functions: tour analysis, schematic optimization, and tour building. The input, output, and monitoring of the system may be provided on display 2010 for viewing.

As shown in FIG. 20, tour optimization and planning system 2000 may comprise a PC or mainframe computer for performing various functions and operations consistent with the invention. Tour optimization and planning system 2000 may be implemented, for example, by a general purpose computer selectively activated or reconfigured by a computer program stored in the computer, or may be a specially constructed computing platform for carrying-out the features and operations of the present invention. Tour optimization and planning system 2000 may also be implemented or provided with a wide variety of components or subsystems including, for example, one or more of the following: one or more central processing units 2020, a co-processor, memory 2050, registers, and other data processing devices and subsystems. Tour optimization and planning system 2000 may also communicate or transfer tours, schematics, loads or other data via I/O interface 2030 and/or network interface 2040 through the use of direct connections or communication links to other elements of the present invention or outside systems. For example, a firewall in network interface 2040 prevents access to the platform by unpermitted outside sources.

Alternatively, communication within tour optimization and planning system 2000 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, tour optimization and planning system 2000 may be located in the same location or at a geographically distant location from users or outside systems.

I/O interface 2030 of the system environment shown in FIG. 20 may be implemented with a wide variety of devices to receive and/or provide the data to and from tour optimization and planning system 2000. I/O interface 2030 may include an input device, a storage device, and/or a network. The input device may include a keyboard, a mouse, a disk drive, video camera, magnetic card reader, or any other suitable input device for providing data to tour optimization and planning system 2000.

Network interface 2040 may be connected to a network, such as a Wide Area Network, a Local Area Network, or the Internet for providing read/write access to records.

Memory device 2050 may be implemented with various forms of memory or storage devices, such as read-only memory (ROM) devices and random access memory (RAM) devices. Memory device 2050 may also include a memory tape or disk drive for reading and providing records on a storage tape or disk as input to tour optimization and planning system 2000. Memory device 2050 may comprise computer instructions forming: an operating system 2052 and one or more modules 2054, 2056, 2058, and 2060. Tour Analysis Module 2054 may perform analysis of past or current tours or loads to develop tours. Schematic Optimization Module 2054 may identify potential lanes based on optimized tours using load history data and generate a potential, optimized schematic of lanes. Tour Builder module 2058 may take a schematic, create a tour as an instance of the schematic, and populate the tour with one or more loads. Interface Module 2060 may interface to external systems to receive or transmit tours, loads, or schematics.

Those skilled in the art will appreciate that all or part of systems and methods consistent with the present invention may be stored on or read from other computer-readable media, such as: secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented code written in the Java and .Net programming language, using applets written in the Java programming language, or may be implemented as with discrete electrical components or as one or more hardwired application specific integrated circuits (ASIC) custom designed just for this purpose.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A computer-implemented method for optimizing a tour having a first segment with an origination point and a destination point and a second segment with an origination point and a destination point, comprising steps implemented by a computer processor of:

receiving first load data about a first load and second load data about a second load, using the computer processor;

evaluating a fit of the first load data on the first segment and a fit of the second load data on the first segment, using the computer processor, wherein evaluating the fit of the first load data further comprises:

determining a common carrier cost for pulling the first load on a common carrier, using the computer processor;

determining a dedicated cost for pulling the first load on the first segment, using the computer processor; and setting a savings criteria for the first segment as the difference between the common carrier cost and the dedicated cost, using the computer processor;

evaluating a fit of the first load data on the second segment and a fit of the second load data on the second segment, using the computer processor;

ranking, in a first list comprising available loads for the first segment, the relative fits of the first load data and the second load data against the first segment, using the computer processor;

ranking, in a second list comprising available loads for the second segment, the relative fits of the first load data and the second load data against the second segment, using the computer processor;

assigning the load having the highest ranking fit from the first list to the first segment and removing that load from the second list, using the computer processor;

assigning the load having the highest ranking fit from the second list to the second segment, using the computer processor; and storing the tour using the assigned loads on a memory coupled to the processor.

2. The computer-implemented method of claim 1, wherein evaluating the fit of the first load data further comprises evaluating key parameters of the first load data, wherein the key parameters include one or more of a time criteria, a distance criteria, and a savings criteria.

3. The computer-implemented method of claim 2, wherein evaluating the fit of the first load data further comprises:

checking a latest ready delivery date of the first load data against the first segment's estimated end date; and if the latest ready delivery date is greater than the estimated end date, setting the first load as unfit for assignment to the first segment.

4. The computer-implemented method of claim 2, wherein evaluating the fit of the first load data further comprises:

checking a latest load ready date of the first load data against the first segment's estimated start date; and if the latest load ready date is less than the estimated start date, setting the first load as unfit for assignment to the first segment.

5. The computer-implemented method of claim 2, wherein the distance criteria include one or more of a segment deadhead criteria, load deadhead criteria, and tour mileage criteria.

6. The computer-implemented method of claim 5, wherein evaluating the fit of the first load data further comprises:

computing the segment deadhead resulting from assigning the first load to the first segment; and if the computed segment deadhead is greater than the segment deadhead criteria, setting the first load as unfit for assignment to the first segment.

7. The computer-implemented method of claim 5, wherein evaluating the fit of the first load data further comprises:

computing the total tour deadhead that would result from assigning the first load to the first segment; and if the computed total tour deadhead is greater than the load deadhead criteria, setting the first load as unfit for assignment to the first segment.

8. The computer-implemented method of claim 5, wherein evaluating the fit of the first load data further comprises:

computing the total tour mileage that would result from assigning the first load to the first segment; and if the computed total tour mileage is greater than the tour mileage criteria, setting the first load as unfit for assignment to the first segment.

9. A system for optimizing a tour having a first segment with an origination point and a destination point and a second segment with an origination point and a destination point comprising:

a memory; and a microprocessor coupled to the memory and programmed to:

receive first load data about a first load and second load data about a second load;

evaluate a fit of the first load data on the first segment and a fit of the second load data on the first segment, wherein the microprocessor evaluates the fit of the first load data by being further programmed to:

determine a common carrier cost for puffing the first load on a common carrier;

determine a dedicated cost for puffing the first load on the first segment; and set the savings criteria the difference between the common carrier cost and the dedicated cost;

evaluate a fit of the first load data on the second segment and a fit of the second load data on the second segment;

rank, in a first ht comprising available loads for the first segment, the relative fits of the first load data and the second load data against the first segment;

rank, in a second list comprising available loads for the second segment, the relative fits of the first load data and the second load data against the second segment;

assign the load having the highest ranking fit from the first list to the first segment and removing that load from the second list; and assign the load having the highest ranking fit from the second list to the second segment.

10. The system of claim 9, wherein the microprocessor is further programmed to evaluate key parameters of the first load data as part of evaluating the fit of the first load data, wherein the key parameters include one or more of a time criteria, a distance criteria, and a savings criteria.

11. The system of claim 10, wherein the microprocessor is further programmed to:
  check a latest ready delivery date of the first load data against the first segment's estimated end date; and
  if the latest ready delivery date is greater than the estimated end date, set the first load as unfit for assignment to the first segment.

12. The system of claim 10, wherein the microprocessor is further programmed to:
  check a latest load ready date of the first load data against the first segment's estimated start date; and
  if the latest load ready date is less than the estimated start date, set the first load as unfit for assignment to the first segment.

13. The system of claim 10, wherein the distance criteria include one or more of a segment deadhead criteria, load deadhead criteria, and tour mileage criteria.

14. The system of claim 13, wherein the microprocessor is further programmed to:
  compute the segment deadhead resulting from assigning the first load to the first segment; and
  if the computed segment deadhead is greater than the segment deadhead criteria, set the first load as unfit for assignment to the first segment.

15. The system of claim 13, wherein the microprocessor is further programmed to:
  compute the total tour deadhead that would result from assigning the first load to the first segment; and
  if the computed total tour deadhead is greater than the load deadhead criteria, set the first load as unfit for assignment to the first segment.

16. The system of claim 13, wherein the microprocessor is further programmed to:
  compute the total tour mileage that would result from assigning the first load to the first segment; and
  if the computed total tour mileage is greater than the tour mileage criteria, set the first load as unfit for assignment to the first segment.

17. A computer-readable storage medium containing instructions for optimizing a tour having a first segment with an origination point and a destination point and a second segment with an origination point and a destination point, the instructions, when executed by a processor, causing the processor to perform stages comprising:
  receiving first load data about a first load and second load data about a second load;
  evaluating a fit of the first load data on the first segment and a fit of the second load data on the first segment, wherein evaluating the fit of the first load data on the first segment further comprises:
    determining a common carrier cost for putting the first load on a common carrier;
    determining a dedicated cost for putting the first load on the first segment; and
    setting a savings criteria as the difference between the common carrier cost and the dedicated cost;
  evaluating a fit of the first load data on the second segment and a fit of the second load data on the second segment;
  ranking, in a first list comprising available loads for the first segment, the relative fits of the first load data and the second load data against the first segment;
  ranking, in a second list comprising available loads for the second segment, the relative fits of the first load data and the second load data against the second segment;
  assigning the load having the highest ranking fit from the first list to the first segment and removing that load from the second list; and
  assigning the load having the highest ranking fit from the second list to the second segment.

18. The computer-readable storage medium of claim 17, wherein the stages further comprise key parameters of the first load data, wherein the key parameters include one or more of a time criteria, a distance criteria, and a savings criteria.

19. The computer-readable storage medium of claim 18, wherein the stages further comprise:
  checking a latest ready delivery date of the first load data against the first segment's estimated end date; and
  setting, if the latest ready delivery date is greater than the estimated end date, the first load as unfit for assignment to the first segment.

20. The computer-readable storage medium of claim 18, wherein the stages further comprise:
  checking a latest load ready date of the first load data against the first segment's estimated start date; and
  setting, if the latest load ready date is less than the estimated start date, the first load as unfit for assignment to the first segment.

21. The computer-readable storage medium of claim 18, wherein the distance criteria include one or more of a segment deadhead criteria, load deadhead criteria, and tour mileage criteria.

22. The computer-readable storage medium of claim 21, wherein the stages further comprise:
  computing the segment deadhead resulting from assigning the first load to the first segment; and
  setting, if the computed segment deadhead is greater than the segment deadhead criteria, the first load as unfit for assignment to the first segment.

23. The computer-readable storage medium of claim 21, wherein the stages further comprise:
  compute the total tour deadhead that would result from assigning the first load to the first segment; and
  if the computed total tour deadhead is greater than the load deadhead criteria, set the first load as unfit for assignment to the first segment.

24. The computer-readable storage medium of claim 21, wherein the stages further comprise:
  computing the total tour mileage that would result from assigning the first load to the first segment; and
  setting, if the computed total tour mileage is greater than the tour mileage criteria, the first load as unfit for assignment to the first segment.

* * * * *